(No Model.) 2 Sheets—Sheet 1.
S. L. O'NEAL.
DRAFTING AND PLOTTING INSTRUMENT.
No. 586,975. Patented July 27, 1897.
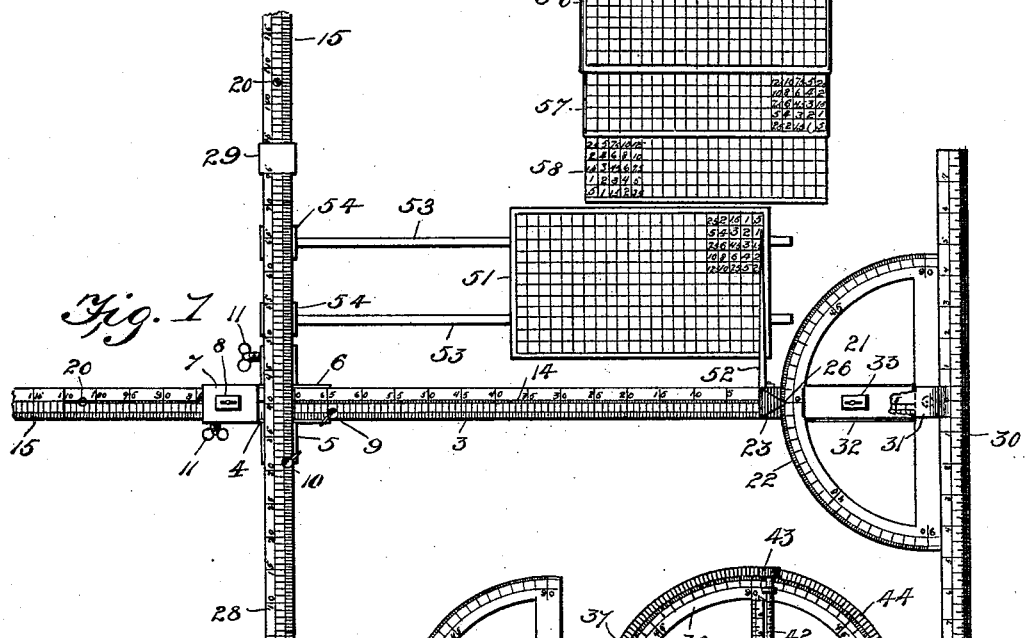

(No Model.) 2 Sheets—Sheet 2.
S. L. O'NEAL.
DRAFTING AND PLOTTING INSTRUMENT.
No. 586,975. Patented July 27, 1897.
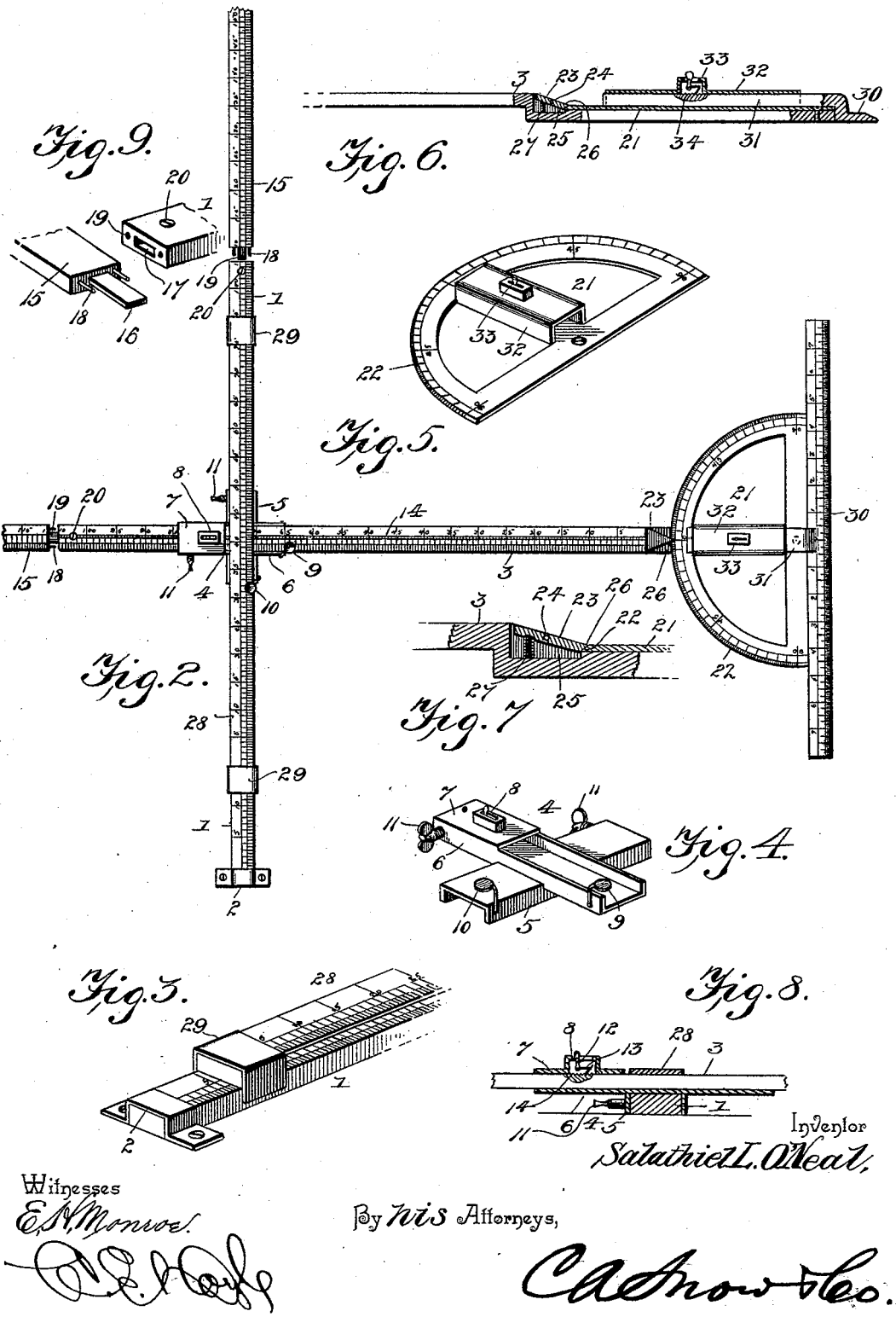

UNITED STATES PATENT OFFICE.

SALATHIEL L. O'NEAL, OF PHILIPPI, WEST VIRGINIA.

DRAFTING AND PLOTTING INSTRUMENT.

SPECIFICATION forming part of Letters Patent No. 586,975, dated July 27, 1897.

Application filed January 15, 1896. Serial No. 575,663. (No model.)

*To all whom it may concern:*

Be it known that I, SALATHIEL L. O'NEAL, a citizen of the United States, residing at Philippi, in the county of Barbour and State of West Virginia, have invented a new and useful Drafting and Plotting Instrument, of which the following is a specification.

My invention relates to drafting instruments, and particularly to a device designed for general mechanical and similar drawing and for plotting in connection with surveying; and the object in view is to provide an efficient and readily-operated instrument by which latitude and departure may be determined with facility and accuracy either with reference to a fixed starting or initial point or in actual measurement, to provide means for plotting diagonal or inclined lines at any given bearing, to provide means for running diagonal lines of given measurement in accordance with a desired scale, to provide means for plotting curved lines from either a fixed or a moving center to form arcs of a circle of a given radius or spirals of a given pitch, and to provide a traverse-table in connection with means for indicating latitude and departure, whereby the operation of computing areas is simplified.

Further objects and advantages of this invention will appear in the following description, and the novel features thereof will be particularly pointed out in the appended claims.

In the drawings, Figure 1 is a plan view of an instrument constructed in accordance with my invention. Fig. 2 is a similar view with the traverse-table omitted. Fig. 3 is a detail view in perspective of one end of the latitudinal bar and the auxiliary or movable scale which is used in connection with the latitudinal bar to determine the length of lines of latitude from any given starting-point. Fig. 4 is a detail view in perspective of the double slide by which the latitudinal and longitudinal bars are connected. Fig. 5 is a detail view in perspective of the protractor. Fig. 6 is a longitudinal section through the protractor in the plane of the adjustable scale which is carried by the protractor. Fig. 7 is a detail section of the pointer or bearing-indicator which is used in connection with the protractor and is adapted to lock the latter at the desired adjustment. Fig. 8 is a longitudinal section of the double slide and the contiguous portions of the latitudinal and longitudinal bars to show the means for mechanically adjusting the longitudinal bar. Fig. 9 is a detail in perspective of the contiguous ends of one of the main bars and its extension. Fig. 10 is a view of a curve-rule which is mounted upon and adapted to be carried by the protractor. Fig. 11 is a plan view, extended, of the traverse-table. Fig. 12 is a longitudinal section of the same. Fig. 13 is a partial plan view of a modified form of the apparatus in which guides are used for both ends of the longitudinal bar.

Similar numerals of reference indicate corresponding parts in all the figures of the drawings.

1 designates a main latitudinal bar, which is preferably fixed to a plotting-table by means of clips 2 and establishes two of the cardinal points of the compass—namely, north and south—and 3 represents a longitudinal bar adjustable upon the latitudinal bar and adapted to establish the remaining cardinal points of the compass—namely, east and west.

In the construction illustrated in the drawings the longitudinal bar is connected with the latitudinal bar by means of a double slide 4, (shown in detail in Fig. 4 and consisting of right-angularly disposed clips 5 and 6, adapted, respectively, to receive the bars 1 and 3.) The clip 6, which is designed for the reception of the longitudinal bar 3, is open at its upper side, with the exception of a small covering-plate 7, arranged at one end and constructed to form a support for a mechanical feeding device 8, whereby said longitudinal bar may be moved in the direction of its length through the slide, said clip 6 being also provided with a magnifying-glass 9, disposed over the graduations of the longitudinal bar to facilitate the adjustment thereof. The other clip 5, which is designed to fit over the main or latitudinal bar 1 and which is open at its under side to facilitate the removal of the longitudinal bar, with the slide, from engagement with the latitudinal bar when it is desired to pack the instrument for transportation, as to and from the place of plotting, is also provided with a magnifying-glass 10. Each of the clips is provided with a set-screw or thumb-screw 11 to lock the latitudinal and longitudinal bars at the desired adjustment.

The mechanical feeding device 8, which operates in connection with the longitudinal bar, preferably consists of a lever 12, carrying a pawl or dog 13, which is arranged to engage a rack 14 on the bar 3.

An extension 15 is provided for each of the longitudinal and latitudinal bars, as shown in detail in Fig. 9, and is adapted to be fitted thereto by means of a tongue 16, adapted to engage a flat socket 17, and pins 18, arranged upon opposite sides of the tongue and adapted to fit in perforations 19. The latitudinal and longitudinal bars are provided, contiguous to the sockets 17, with set-screws 20 to engage the tongues 16.

Mounted for angular adjustment upon one end of the longitudinal bar is an angle-gage or protractor 21, graduated to indicate bearing in degrees from "1" to "180," with the necessary subdivisions, and in operative relation with the beveled outer edge 22 of this angle-gage or protractor is arranged a bearing-indicator or pointer 23. In the construction illustrated this bearing-indicator or pointer is of such form as to adapt it for locking the angle-gage or protractor at the desired adjustment, and with this object in view said indicator or pointer is pivoted at an intermediate point, as shown at 24, Fig. 7, in a small cavity 25 in the contiguous portion of the longitudinal bar and is sharpened or reduced to a point at its outer end, as shown at 26, to engage slight cuts or serrations in the face of the beveled edge 21, said cuts or serrations corresponding with the graduations. This indicator or pointer is held normally in engagement with the protractor by means of an actuating-spring 27, and when it is desired to adjust or readjust the angle-gage or protractor it is simply necessary to depress the inner and thereby elevate the outer end of said indicator sufficiently to remove the outer end from engagement with the cuts or serrations.

In connection with the main latitudinal and longitudinal bars, as above described, I employ an auxiliary latitudinal rule or adjustable gage 28, Fig. 3, which is mounted to slide upon the main latitudinal bar, for which purpose it is provided with terminal clips 29, said auxiliary latitudinal bar or gage being so arranged in the construction illustrated as to operate above the plane of the clip 6 of the double slide, and the magnifying-glass 10, which is above described as being carried by the clip 5, is disposed above the fine graduations of this auxiliary latitudinal bar or gage, whereby the accurate adjustment thereof may be attained.

By means of the apparatus above described it is obvious that the latitude and departure of any given line may be determined with accuracy both as to position and length, the latitudinal and longitudinal bars being graduated with relation to any preferred scale, as inches and parts thereof, feet and parts thereof, or rods and parts thereof, the longitudinal bar, by reason of the double slide, being capable of both latitudinal and longitudinal movement. Thus the protractor or any part of the longitudinal bar may be arranged at any given latitude or at any desired distance from the latitudinal bar, or, in other words, may be arranged at any part of the plotting-table within an area of which the dimensions are determined by the respective lengths of the latitudinal and longitudinal bars.

It will be understood, furthermore, that in plotting from a fixed starting or initial point the total or sum of latitudinal lines will be indicated by the graduations on the main latitudinal bar, but if it is desired to determine the length of a line from a movable starting or initial point or the length of each measurement in latitude or each "run," without regard to the location of the starting-point, the auxiliary latitudinal bar or gage is used. To measure a given run, the auxiliary bar or gage is moved to bring the initial point of its scale opposite the starting or initial point, and hence the exact length of the line plotted will be indicated thereon irrespective of previous lines plotted in the same direction.

When it is desired to run diagonal lines, I employ a detachable rule mounted upon and carried by the angle-gage or protractor, and therefore adapted to be arranged at any desired angle with reference to the latitudinal or longitudinal bar, the outer edge of the rule being beyond and unobstructed by the bar. In the construction illustrated this angle-rule is provided with a stem 31 to fit in a guide or sleeve 32 on the angle-gage or protractor, a mechanical feeding device 33, which is similar in construction to that above described, as at 8, being arranged to operate in connection with a rack 34 on said stem. The angle-rule is graduated to any desired scale and is capable, by reason of said stem, of transverse linear adjustment toward and from the protractor to secure the necessary accuracy of position independently of the adjustment of the longitudinal bar 3, and by means of this rule a line in any direction or at any angle between those established by the latitudinal and longitudinal bars may be run.

When it is desired to draw curved lines either from a fixed or a moving center, I employ a circle-gage 35, graduated to indicate three hundred and sixty degrees and consisting, essentially, of a rotary member 36, mounted within a stationary ring 37, the stationary ring being provided with a stem 38, which corresponds in construction and function with the stem 31 of the angle-rule 30 in that it provides for the mounting of the circle-gage upon the angle-gage or protractor, said angle-gage or protractor being meanwhile locked at the desired adjustment by means of the devices provided for that purpose. The rotary member 36 of the circle-gage carries a transverse or diametrical linear gage 39, upon which is mounted to slide a pencil-holder 40, by which a curve described on an arc of any given radius and of any given number of degrees in extent may be drawn. Also mounted upon said transverse or linear gage 39 is a pencil-holder 41, with which is engaged the feed-screw 42, terminating at its outer end in a pinion 43, which traverses a circular rack 44 on the fixed or outer ring 37. When this mechanically-operated holder 41 is in use, the rotation of the member 36 by means of the knob 45, provided for that purpose, causes a continuous longitudinal or linear movement of the holder, and hence the curve is described around a moving center or is a spiral of which the pitch is regulated by the pitch of the feed-screw 42. By employing feed-screws of different pitch the spirals may be varied as required. In connection with the graduations on the rotary member of the circle-gage there is a fixed pointer or index 46.

When it is necessary to plot large tracts or upon a large scale, which requires the instrument to traverse a large area, I have found it desirable to employ, in addition to the main latitudinal bar, a guide-bar 47, parallel with said latitudinal bar, to support the outer or free end of the longitudinal bar, as shown in Fig. 13, a slide or clip 48 being mounted upon said guide-bar to support the end of the longitudinal bar 49. When this additional guide-bar is employed, the longitudinal bar is preferably mounted for movement parallel with the latitudinal bar, but is not mounted for movement in a longitudinal direction, and hence in this connection I preferably employ a movable pointer or indicator 50, Fig. 13.

In connection with the apparatus as above described I also employ a traverse-table 51, adapted for indicating the areas of triangles of which the hypotenuses have certain latitudes and departures, said traverse-table being mounted to slide upon the main latitudinal bar, whereby it is adjustable to suit the position of the longitudinal bar which carries the traverse pointer or index 52. The means whereby this traverse-table is mounted embody parallel longitudinal arms 53, provided with clips 54, which engage a slide upon the main latitudinal bar 1, said traverse-table having latitudinal movement or movement parallel with the latitudinal bar by means of the clips 54, sliding upon said bar, and having longitudinal movement by sliding upon the arms 53, whereby the initial point of the traverse-table in running lines in any given direction may be arranged at any desired part of the space within reach of the outer extremity of the longitudinal bar.

The traverse-table which I have shown in the drawings is of quadruplex construction and embodies four sections or members fitted to slide or telescope and adapted to be independently exposed, according to the direction in which a line is to be run. For instance, as shown clearly in Fig. 11, the section or member 55 is graduated for running lines in a southwesterly direction, the sectional member 56 is graduated for running lines in a southeasterly direction, the section 57 is graduated for running lines in a northwesterly direction, and the section 58 is graduated for running lines in a northeasterly direction. In each member or section of the traverse-table the graduations increase from an initial point, which may be called "zero," in the direction of the lines which may be run thereon or in connection therewith, the graduation corresponding with the latitude and departure of a line run a certain distance in a given direction being indicated by the pointer 52.

In the traverse-table illustrated in the drawings the graduations indicate absolute areas of right-angle triangles having hypotenuses of different lengths, said areas being indicated in the blocks which are formed by intersecting latitudinal and longitudinal lines arranged, respectively, at prescribed distances from a given starting-point. For instance, in the first block at the initial point of one of the sections or members of the traverse-table is placed the numeral ".5," representing one-half, and this indicates that a line run from the initial point to the outer angle of the first block, and hence having a latitude of "1" and a departure of "1," is the hypotenuse of the right-angle triangle of which the area is one-half, inasmuch as the area of a triangle is equal to one-half the base multiplied by the altitude. In the same way a line of which the altitude is "3" and the departure is "2" (indicated, respectively, by three blocks in latitude or parallel with the latitudinal bar and two blocks in longitude or parallel with the longitudinal bar) is the hypotenuse of the right-angle triangle of which the altitude is "3" and the base "2," and in the block or space at the intersection of the lines respectively representing said latitude of "3" and departure of "2" will be found the numeral "3," thus indicating that the area of the triangle of which the hypotenuse has a latitude of "3" and a departure of "2" is "3." The altitude multiplied by the base is "6," and one-half of "6" is "3," or the area of the given triangle.

The terminal edges of the members or sections of the traverse-table, as illustrated in the drawings, are folded or doubled to form guides 59, as shown in Fig. 12, whereby the sectional member, having the scale adapted for the direction in which it is desired to run a line, may be extended irrespective of the other sections or members.

It will be understood that any suitable or preferred antifriction-bearings may be employed in connection with the slides or clips to secure the necessary freedom of movement of the parts.

The arrangement of the straight outer edge of the angle-rule beyond the end of the longitudinal bar provides for measurements or drawing lines guided by said outer edge, either parallel with or at any desired angle with the longitudinal bar and intersecting the latter, without interference or obstruction at the point of intersecting said bar. In the same way the central or cross bar of the angle-gage or protractor projects beyond its pivotal point upon the longitudinal bar and is unobstructed to provide for drawing lines intersecting the line of the longitudinal bar, and the central cross-bar of the circle-gage is adapted to perform a similar function. In either case the central portion of the rule is unobstructed by the longitudinal bar.

It will be understood that in practice various changes in the form, proportion, and the minor details of construction may be resorted to without departing from the spirit or sacrificing any of the advantages of this invention.

Having described my invention, what I claim is—

1. In a drafting implement, the combination with a latitudinal and an adjustable longitudinal bar, of a circle-gage having a rotary member, and a holder for a marking device mounted upon the rotary member for linear adjustment, substantially as specified.

2. In a drafting implement, the combination with a latitudinal and an adjustable longitudinal bar, of a circle-gage having a fixed ring, a rotary member mounted in said ring and having a diametrical linear gage, a holder for a marking device mounted for linear adjustment upon said gage, and connections between the holder and the ring whereby movement of the rotary member causes linear movement of the holder, substantially as specified.

3. In a drafting implement, the combination with a latitudinal and an adjustable longitudinal bar, of a circle-gage having a fixed ring, a rotary member mounted in said ring and having a diametrical linear gage, a holder for a marking device mounted for linear adjustment upon said gage, and a feed-screw connected with the holder and having a pinion meshing with a rack on the ring, to cause a linear movement of the holder when the rotary member is operated, substantially as specified.

4. A drafting implement having a stationary latitudinal bar, a longitudinal bar mounted for latitudinal and longitudinal movement, and an auxiliary latitudinal gage mounted to slide upon and parallel with the main latitudinal bar, and capable of independent movement to facilitate the measurement of independent latitudinal runs, substantially as specified.

5. A drafting implement having a fixed main latitudinal bar, an adjustable longitudinal bar mounted upon the latitudinal bar by means of a removable slide, and a removable auxiliary gage mounted to slide upon and parallel with the latitudinal bar, substantially as specified.

6. A drafting implement having a latitudinal bar, an adjustable longitudinal bar, a traverse-table adjustably mounted upon the latitudinal bar, and a pointer carried by the longitudinal bar to traverse said table, substantially as specified.

7. A drafting implement, having latitudinal and longitudinal bars, and a traverse-table adjustably mounted upon the latitudinal bar and having sections or members connected for relative adjustment, the graduations thereon being arranged to progress respectively in different directions, to suit the different general directions in which a line may be run from a given initial point, substantially as specified.

8. A drafting implement having latitudinal and longitudinal bars, and a pointer mounted upon the longitudinal bar and adapted to move latitudinally and longitudinally therewith, and a traverse-table mounted upon the latitudinal bar for latitudinal and longitudinal movement, substantially as specified.

9. A drafting implement having latitudinal and longitudinal bars, a pointer mounted upon the longitudinal bar for latitudinal and longitudinal movement, and a traverse-table mounted upon the latitudinal bar and constructed of relatively adjustable sections, each graduated to increase numerically in a different direction, substantially as specified.

10. A drafting implement having latitudinal and longitudinal bars, a pointer carried by one of the bars, and a traverse-table carried by the other bar and comprising telescoping sections having terminal guides and adapted to fold within the area of a single section, substantially as specified.

In testimony that I claim the foregoing as my own I have hereto affixed my signature in the presence of two witnesses.

SALATHIEL L. O'NEAL.

Witnesses:
JOHN H. SIGGERS,
GEO. C. SHOEMAKER.